March 2, 1965

R. F. RASMUSSEN 3,171,618

SIGNAL SELECTOR FOR CONTROL APPARATUS

Filed Jan. 30, 1963

INVENTOR.
ROBERT F. RASMUSSEN
BY *Gordon T. Reed*

ATTORNEY

United States Patent Office 3,171,618
Patented Mar. 2, 1965

3,171,618
SIGNAL SELECTOR FOR CONTROL APPARATUS
Robert F. Rasmussen, Brooklyn Center, Minn., assignor to Honeywell Inc., a corporation of Delaware
Filed Jan. 30, 1963, Ser. No. 255,048
17 Claims. (Cl. 244—78)

This invention relates to control systems and more particularly relates to aircraft control systems, wherein such system combines electrically controlled fluid valves and a main fluid operated actuator to obtain more reliable operation of said actuator by flight control apparatus.

The invention pertains to the area of increasing reliability of flight control systems and the increased reliability herein is effected through the provisions of redundancy.

An object herein is to achieve substantial increase in reliability in operation of the control system while incurring minor weight penalties by a novel monitor or selection means for redundant components.

A further object of this invention is to increase reliability of a control system by redundant components which separately provide alternate means or alternative means of achieving a function and wherein a novel monitoring means is provided to select one of a plurality of such components in the event of dissimilarity in operation of the plurality of components.

Other objects and advantages of the invention will become apparent upon a study of the following description when taken in conjunction with the accompanying drawings, wherein.

The invention relates to increasing the reliability in control systems for assuring the performance of a mission wherein the reliability utilizes redundant components operated in parallel and a voting means or selector responsive jointly to all redundant elements in selecting one redundant element among the plurality for controlling an actuator for a control system on an aircraft. The selected redundant element has an operation that is intermediate the extremes in operation of other redundant elements.

Figure 1:
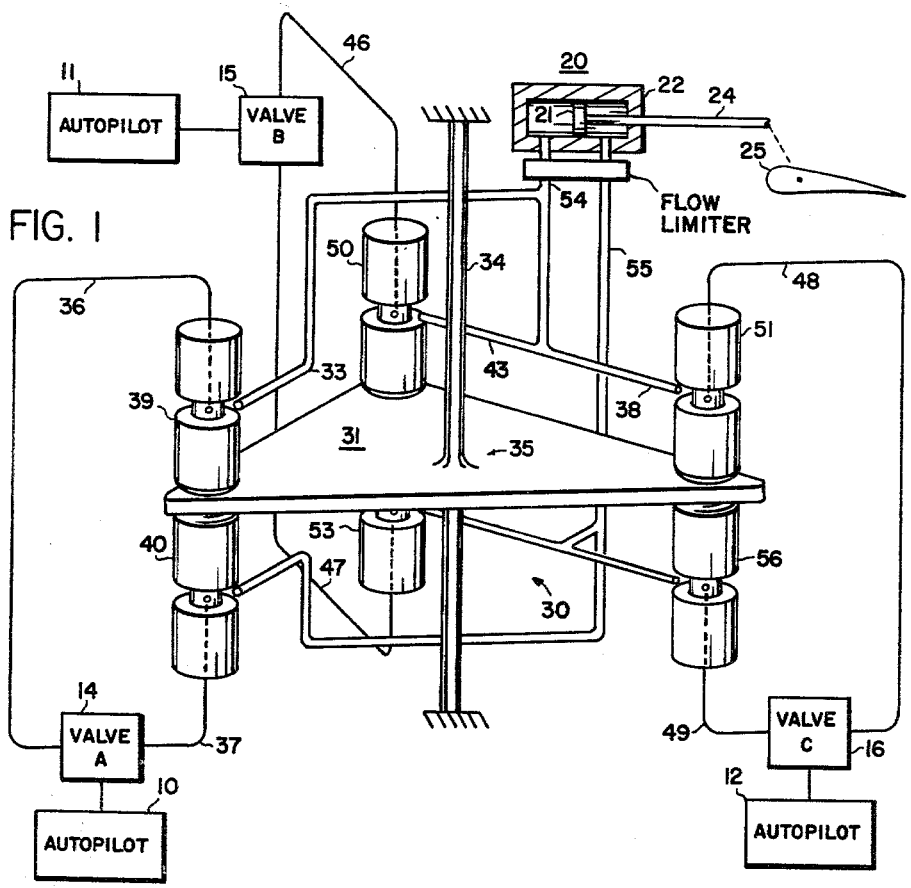
FIGURE 1 illustrates the overall automatic control system for aircraft with the monitoring means included therein.

With reference now to FIGURE 1, there is shown a plurality of autopilots, 10, 11 and 12 normally providing similar output electrical control signals that respectively variably control the positions of fluid control valves 14, 15, and 16 in accordance with the magnitude of a control signal. Such duplicate autopilots 10, 11 and 12 are shown merely in block outline since the details thereof are not important to the present invention. Such autopilots and also control valves may correspond to the autopilot circuit and valve 410, FIGURE 4, respectively of the patent to Rasmussen 3,034,483. In FIGURE 4 of the patent, the autopilot circuit as identified and the control valve indicated by reference character 410 control the operation of a piston 451 or ram of an actuator. In a generally similar manner an actuator piston is operated herein.

It will thus be evident that upon the occurrence of a control signal in the autopilot sections 10, 11, and 12 the fluid control valves 14, 15 and 16 which are of the pressure control type are displaced from a normal position. When so displaced, a differential pressure will result in fluid passages corresponding with fluid passages 453, 455 of the Rasmussen FIGURE 4 above. While the patent shows such fluid passages 453, 455 directly coupled to opposed sides of ram 451, in the present invention a monitoring arrangement 30 herein is provided intermediate passages 36, 37; 46, 47; 48, 49 controlled by the valves 14, 15 and 16 and a piston 21 of an actuator 20, said actuator comprising cylinder 22. A displacement of the piston 22 is applied through output linkage 24 to position a control surface 25 of an aircraft.

Monitoring arrangement 30 is embodied in "three-dimensional" hardware and comprises a wobble plate 31 mounted on a support 34 by a bearing 35 and rotatable about three axes to have three degrees of movement. Wobble plate 31 is generally triangular in shape and is engaged at three points thereof equally spaced by three pairs of valve operated pistons 39, 40; 50, 53; 51, 56 having the housing or bodies therefor omitted in FIGURE 1 for clarity. The pair of pistons shown in FIGURE 1 without their associated bodies engage opposite sides of the tiltable or wobble plate 31.

Figure 2:
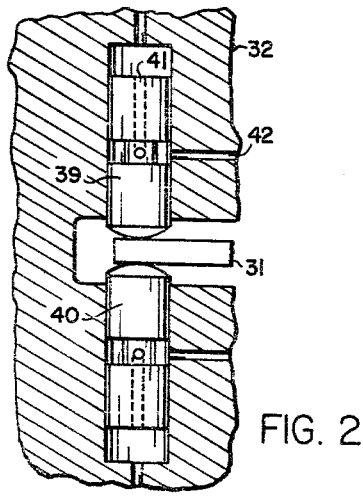
FIGURE 2 illustrates a portion of the monitoring means as controlled by redundant elements of the system.

As shown in FIGURE 2, with respect to pistons 39, 40 for example the maximum travel of each valve controlled piston within piston body 32 is limited to a distance where the valve is just turned "off" wherein fluid passage 41 no longer communicates with passage 42 in the body. Because the piston "bottoms" in the body to provide a limited distance of travel to where the valve is just turned "off" the action of the tiltable or wobble plate is so governed that if the differential valve pressures are unlike it will thereby permit only the valve output with an intermediate pressure differential to be connected to the output cylinder 22 of actuator 20.

This selection of control of the piston 21 of actuator 20 by the particular valve 14, 15 or 16 having differential pressures intermediate extreme pressures of the other two valves will be reviewed. The differential fluid pressure in passages 36, 37 of valve 14 wherein such passages correspond with passages 14, 15 of the aforesaid Rasmussen patent are applied to pistons 39, 40 that engage opposed sides of wobble plate 31. A similar set of pistons 50, 53; 51, 56 is provided respectively for each other pair of valve output passages 46, 47; 48, 49 of valves 15, 16.

It is evident that upon application of equal differential pressure to the wobble plate 31, it will not be tilted. Fluid will be transmitted through passage 36, assuming it connected to the supply pressure for example, through passage 41 in piston 39, piston body output passage 42, conduit 33, through fluid conduit 54 to the left side of piston 21. In a similar manner as to valve 15 fluid pressure from passage 46 passes through piston valve 50, conduit 43, conduit 54, to one side of piston 21. Fluid also passes from valve 16 through fluid conduit 48 and valve piston 51, conduit 38 to servo conduit 54.

In the event, however, that valve 14 applies a differential downward pressure of 10 units on plate 31, valve 15 applies a differential pressure downwardly of 9 units on plate 31 and valve 16 applies a differential downward pressure of 8 units on wobble plate 31, it is desired to select the intermediate pressure namely 9 units as the differential pressure for controlling operation of piston 21. Such selection is achieved by a composition of forces acting on the wobble plate 31. As between pressures 10, 9 which are applied to opposite ends of a line intersecting a tilt axis running through the shaft bearing 35 and the point of application of 8 units pressure, the wobble plate 31 angularly moves downwardly due to the greater effort of 10 units applied by valve piston 39 over a lesser pressure of 9 units in valve piston 50. Also as between the 10 units differential pressure at piston 39 and the 8 units pressure at valve piston 51 applied to opposite ends of a line intersecting a second line passing through bearing 35 and the point of contact of valve piston 50 and wobble plate 31, the 10 units force predominates. Further as to the 9 units pressure at valve piston 50 and the 8 units pressure at valve piston 51, the 9 units pressure predominates.

Concerning the resultant direction of angular movement or tilt of wobble plate 31 and considering firstly the resultant pressure at valve piston 50, it is evident that in one instance there is a resultant 1 unit force tending to move the valve piston 50 upwardly and in a second instance a 1 unit resultant force tending to move the valve piston 50 or wobble plate 31 downwardly with the result that the wobble plate 31 at this point remains substantially fixed. At the point of wobble plate 31 receiving the pressure through valve piston 51, there is a resultant 3 units force upwardly; further as to the point of wobble plate 31 engaged by valve piston 39 there is a resultant 3 units pressure downwardly. Consequently, the wobble plate 31 angularly moves about bearing 35 about an axis passing through the bearing 35 and the point of engagement of piston 50 and plate 31 and during such movement, valve pistons 39 and 51 move to the "off" position closing off conduits 33, 38 from conduits 36, 48 for example and piston 51 bottoms. However, the valve piston 50 remains in its normal position, since with the two pistons bottomed plate 31 cannot be otherwise tilted, and its pressure is applied to the conduits 54, 55 connected to opposed sides of piston 21 for operation thereof. Since valves 14, 15, 16 are of the pressure control type there is provided in conduits 54, 55 flow limiting orifices or a pressure-to-flow converting second stage 57 in FIGURE 1.

In the event that there are other unequal differences in differential pressure such as of 10, 9 and 7 units rather than 10, 9 and 8 as considered above and assuming the 7 units force is applied where the 8 units force had been applied previously, there will be a resultant upward pressure of 5 units at the point of application of the 7 units force due to the 10 and 9 units forces, there will be a 1 unit upward force at the application of the 9 units force, and there will be a resultant downwatrd 4 units force at the point of application of the 10 units force. The valve pistons 51, 53 at the point of application of the 7 and 10 units forces will be "bottomed" so as to close off the valve pistons at these positions. Thus neither valve 14 or 16 will control operation of the actuator piston 21.

Inasmuch as the valve pistons 51, 53 have bottomed at the point of application of the 7 and 10 units forces, the pair of valve pistons associated with the point of application of the 9 units force will be in central position which position is shown in FIGURE 2, and will control the piston 21 of actuator 20. In other words with the points of application of the 10 and 7 units forces respectively oppositely bottomed, that is down and up, the point of application of the 9 units force, which is on a line through bearing 35 and intersecting the line joining the points of application of the 7 and 10 units forces, is then in intermediate position or normal position shown in FIGURE 2.

The reliable operation of the control system made possible by the present novel monitoring arrangement so greatly enhances utility of the fluid operated servomotor 20 and the advantages thereof over other control systems not utilizing the redundancy techniques herein may now be fully realized.

While there has been described what is considered a preferred embodiment of the invention, it will be apparent that many and various changes and modifications may be made herein without departing from the spirit of the invention. It will be understood therefore that all changes and modifications as fall fairly within the scope of the present invention as defined in the appended claims are to be considered as part of the present invention.

What is claimed is:

1. A fluid pressure operated ram; three operable fluid control valves for said ram; differential fluid pressure responsive means including an angularly movable sensing means responsive jointly to differential pressure across all three valves, for connecting at least one of said valves for operating said ram.

2. In a fluid power system having an operable ram and three fluid control valves operable from a normal position: fluid pressure responsive means including an angularly tiltable sensing means responsive jointly to differential pressure across three valves when said valves are displaced from a normal position, said tiltable sensing means connecting at least one of said valves for control purposes to said ram.

3. The apparatus of claim 2 wherein the differential pressure responsive means comprise a member engaged at three spaced points each corresponding to an apex of a triangle.

4. The apparatus of claim 3 wherein the member is engaged on opposite sides at the three spaced points by a pair of devices, each pair responsive to the differential pressure across one individual valve when displaced from a normal position.

5. The apparatus of claim 4 wherein each device has a limited displacement to thereafter act as a stop to further movement of said member.

6. In a control system for effecting movement of a control member by a fluid operated actuator connected to said member and having a plurality of fluid valves for controlling the porting of fluid to said actuator for determining the direction of actuator movement: a sensing or voting means for selecting one of the plurality of valves for controlling said actuator comprising differential pressure responsive means including an angularly movable sensing means responsive jointly to differential pressure across the plurality of valves, for connecting on tilting from a null position one of said valves to said actuator.

7. The apparatus of claim 6 wherein upon a dissimilarity in pressure in all three valves, the plate is tiltable about three axes having a common point.

8. In an aircraft control system for effecting displacement of a control surface by a fluid operated actuator having a plurality of valves for controlling operation of the actuator; sensing means for selecting the valve having a differential pressure thereacross intermediate the opposed extreme pressures of two remaining valves for controlling said actuator, said sensing means comprising an angularly movable device responsive jointly to differential pressure across all said valves.

9. In an aircraft control system having a fluid type actuator for positioning a control surface of the craft and having a plurality of fluid transmitting valves for controlling said actuator; selecting means responsive to pressures across said plurality of valves applied at several points thereof and movable thereby for connecting one of said valves in controlling relation to said actuator.

10. The apparatus of claim 9 wherein the sensing means comprises a plate tiltable about several axes and having limited movement about all said axes.

11. The apparatus of claim 2 wherein said tiltable means is engaged at spaced points by devices each responsive to pressure from one valve, said devices being adjustable in two positions wherein in one position of said device the valve associated therewith controls said actuator and in another position wherein said valve is rendered ineffective to control said actuator.

12. The apparatus of claim 1 wherein each device has limited displacement to limit the tilt applied to said plate by the preponderant pressures.

13. In a control system for effecting movement of a control member by an actuator connected to said member and having a plurality of variably operated power transmitting means for controlling said actuator for determining the direction of actuator movement; a sensing or voting means for selecting one of the plurality of transmitting means for controlling said actuator comprising force responsive means including an angularly movable sensing means responsive jointly to forces varying in magnitude with the operation of all the transmitting means and applied by said plurality of transmitting means for operatively connecting on tilting from a null position one of said transmitting means to said actuator.

14. In a control system for effecting displacement of a control surface of an aircraft by an actuator connected to said surface said system having several variably operated power transmitting means for controlling said actuator for determining the direction of actuator displacement: a sensing or voting means for selecting one of the transmitting means for controlling said actuator comprising force responsive means including an angularly tiltable sensing means responsive jointly to the force which varies in magnitude with the magnitude of operation of such transmitting means for connecting for operation on tilting of the sensing means from a null position one of said transmitting means to said actuator.

15. In an aircraft control system for effecting change of aircraft position through a control surface operated by an actuator connected thereto, said actuator having a plurality of variably operable power transmitting means for controlling said actuator for determining the direction of actuator displacement: a sensing or voting means for selecting at least one of a plurality of power transmitting means for controlling said actuator comprising force responsive means responsive jointly to a plurality of forces in accordance with the power supplied by all of said transmitting means, for connecting for operation on tilting from a null position one of said power transmitting means to said actuator.

16. In an aircraft control system for effecting change in attitude of the craft by operation of attitude changing means by an actuator operated by several autopilots transmitting electrical signals to signal responsive controllers: monitoring means having three degrees of movement responsive to all said controllers and selecting one of said controllers for controlling said actuator and rendering the remaining controllers ineffective on said actuator when the outputs of the several controllers which depend upon the magnitude of the electrical signals applied thereto differ among the several controllers.

17. In an aircraft control system having a member positioned by an actuator to control a condition: a plurality of signal responsive controllers each having an output dependent upon the magnitude of the signal applied thereto, monitoring means responsive simultaneously to all said controllers selecting one of said controllers for controlling said actuator upon a substantial difference in outputs of the several controllers.

References Cited by the Examiner
UNITED STATES PATENTS 2,398,158   4/46   Ray _____ 94—453 X
2,563,834   8/51   Gillespie _____ 91—453 X MILTON BUCHLER, *Primary Examiner.*

ANDREW H. FARRELL, *Examiner.*